United States Patent
Maggiari (10) Patent No.: US 8,964,535 B2
(45) Date of Patent: Feb. 24, 2015

(54) METHODS, APPARATUS AND COMMUNICATION NETWORK FOR PROVIDING RESTORATION SURVIVABILITY

(75) Inventor: Massimiliano Maggiari, Genoa (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 157 days.

(21) Appl. No.: 13/574,574

(22) PCT Filed: Feb. 4, 2010

(86) PCT No.: PCT/EP2010/051334
§ 371 (c)(1),
(2), (4) Date: Oct. 8, 2012

(87) PCT Pub. No.: WO2011/088903
PCT Pub. Date: Jul. 28, 2011

(65) Prior Publication Data
US 2013/0128725 A1 May 23, 2013

(30) Foreign Application Priority Data
Jan. 22, 2010 (EP) .................................... 10151450

(51) Int. Cl.
*G01R 31/08* (2006.01)
*H04L 12/24* (2006.01)

(52) U.S. Cl.
CPC ........ *H04L 41/0668* (2013.01); *H04L 12/2422* (2013.01)
USPC .......................................... 370/225; 370/254

(58) Field of Classification Search
None
See application file for complete search history.

(56) References Cited

U.S. PATENT DOCUMENTS

| | | | | |
|---|---|---|---|---|
| 5,218,601 A | * | 6/1993 | Chujo et al. | 370/228 |
| 5,463,615 A | * | 10/1995 | Steinhorn | 370/221 |
| 5,832,196 A | * | 11/1998 | Croslin et al. | 714/4.3 |
| 7,287,081 B1 | | 10/2007 | Deboer et al. | |

FOREIGN PATENT DOCUMENTS

| | | |
|---|---|---|
| CN | 1578223 A | 2/2005 |
| EP | 1420598 A1 | 5/2004 |
| EP | 1499049 A1 | 1/2005 |

OTHER PUBLICATIONS

International Search Report, Application No. PCT/EP2010/051334, dated Sep. 29, 2010, 4 pages.

(Continued)

*Primary Examiner* — Kevin C Harper
(74) *Attorney, Agent, or Firm* — Blakely Sokoloff Taylor & Zafman LLP (57) ABSTRACT

The invention relates to a method and an apparatus for proving protection in a connection oriented packet switched communications network. Embodiments of the invention disclose detecting a fault in a path of the network, the path comprising at least one network resource, determining a new path for the traffic, restoring the traffic to the new path, and determining where the fault has occurred in the path using the management plane to correlate the fault with the at least one network resource using a configuration map of the network. The embodiments of the invention provide for dynamic protection using a management plane in the event of a failure in the network.

14 Claims, 4 Drawing Sheets

(56) References Cited

OTHER PUBLICATIONS

N. Sprecher et al., "Multiprotocol Label Switching Transport Profile Survivability Framework; draft-ietf-mpls-tp-survive-fwk-03.txt," Nov. 9, 2009, 52 pages, Network Working Group, Internet-Draft, IETF Trust.

E. Mannie et al., "Recovery (Protection and Restoration) Terminology for Generalized Multi-Protocol Label Switching (GMPLS)," Mar. 2006, 22 pages, Network Working Group, Request for Comments: 4427, The Internet Society.

D. Papadimitriou et al., "Analysis of Generalized Multi-Protocol Label Switching (GMPLS)-based Recovery Mechanisms (including Protection and Restoration)," Mar. 2006, 47 pages, Network Working Group, Request for Comments: 4428, The Internet Society.

I. Busi et al., "MPLS-TP OAM Framework and Overview, draft-busi-mpls-tp-oam-framework-01.txt," Mar. 9, 2009, 27 pages, MPLS Working Group, Internet Draft, IETF Trust.

* cited by examiner

METHODS, APPARATUS AND COMMUNICATION NETWORK FOR PROVIDING RESTORATION SURVIVABILITY

CROSS-REFERENCE TO RELATED APPLICATIONS

This application is a National stage of International Application No. PCT/EP2010/051334, filed Feb. 4, 2010, which claims the benefit of EP Application No. 10151450.3, filed Jan. 22, 2010, which are hereby incorporated by reference.

TECHNICAL FIELD

The invention relates to a method and an apparatus for proving protection in a communications network.

BACKGROUND

Carrier Ethernet networks are continuing to evolve to provide high speed Ethernet technology for metro area networks. This evolution is driving the replacement of network equipment from switched transport equipment, such as Ethernet Provider Bridge technology, to Connection Oriented Packet Switched (CO-PS) technology. Such replacement of network equipment is aimed at improving the reliability for transmitting communications traffic through the network. In this regard Transport Multi Protocol Label Switching (T-MPLS) and Multi Protocol Label Switching Transport Profile (MPLS-TP) have been previously considered for such Carrier Ethernet networks.

There are many types of protection mechanisms that may be used in a CO-PS network. Such protection mechanisms aim to provide protection to the network in the event of failure of a path, link, or device within the network so that disruptions to communications services are reduced. It is known to use 1+1 protection where traffic in the network is actively transmitted from a source node to a sink node on both a worker path and a main protection path. It is also known to use 1:1 protection where the traffic is only transmitted on the working path but a main protection path is allocated and used for sending traffic when a failure of the worker path occurs. Such 1+1 or 1:1 protection may be implemented as Revertive protection or Non-Revertive protection. Revertive protection requires that traffic is switched to a protection path when the worker path fails, and then back to a worker path when the worker is available for use. Non-Revertive protection requires that traffic stays on the protection path even when the worker path is available for use.

It is further known to provide static and dynamic protection schemes for a communications network. The 1+1 and 1:1 protection mechanisms described above are examples of static protection whereby the required protection is planned in advance of a failure occurring. Dynamic protection may be defined as the determining of the required protection after a failure occurs.

A management plane is typically used in a communications network to carry any operation and administration traffic that may be required for network management. This traffic may include configuration traffic or maintenance traffic for configuration and maintenance purposes. A control plane is also typically used in the communications network to perform routing of user traffic to define where packets are to be sent within the network. Standardisation activities for MPLS-TP are continuing to develop, and the current standards define a control plane as an optional feature. Standardisation activities for T-MPLS are more advanced, but the current standards do not define a control plane. Typically, when a control plane is not present in a communications network, the management plane is used to provide configuration and monitoring of the network only for static protection schemes. In the absence of a control plane the use of dynamic protection schemes is not considered.

Using only static protection schemes for handling failures in a network can lead to a number of problems. In the event of a multiple failure within the network, the network operator must follow specific procedures to manually restore the communications traffic. Such manual restoration procedures are generally very time consuming and may incur a high operational expenditure for the network. In addition, the need for manual intervention in the case of multiple faults may lead to a higher network down-time which can have a negative impact on Quality of Service and Service Level Agreements. Furthermore, static protection schemes require network resources to be pre-allocated which represents sub-optimal use of bandwidth availability within the network. Overall, the use of only static protection schemes may not utilise network resources efficiently.

SUMMARY

It is desirable to provide a way of permitting a Carrier Ethernet network to readily recover from failures, and to reduce or minimise at least some of the above-mentioned problems.

According to a first aspect of the invention, there is provided a method of protecting communications traffic in a connection oriented packet switched communications network using a management plane. The method including detecting a fault in a path of the network, the path comprising at least one network resource. The method including determining a new path for the traffic. The method including restoring the traffic to the new path. The method including determining where the fault has occurred in the path using the management plane to correlate the fault with the at least one network resource using a configuration map of the network.

Such a method provides for dynamic protection using a management plane in the event of a failure within the network. Since the method is readily automated it may lead to a reduced down-time for the network which may improve Quality of Service and Service Level Agreements. Furthermore, using dynamic protection means that network resources can be used for different dynamic protected connections at different times, which represents an improved use of bandwidth availability in the network. Accordingly, such a method may lead to a more optimised use of network resources. Overall the method provides a greatly improved way for protecting a path in the communications network by reducing effort required, and increasing the efficiency with which the protection is provided. This may further lead to a reduced operational expenditure and capital expenditure for the network.

Further features of the invention are as claimed in the dependent claims.

According to a second aspect of the invention there is provided a management plane apparatus for protecting communications traffic in a connection oriented packet switched communications network. The apparatus comprising a fault management device for receiving at least one indication relating to a fault in a path of the network. The path comprises at least one network resource. The apparatus comprising restoration management device to initiate a restoration procedure in response to the indication to restore the traffic to a new path.

The apparatus comprising configuration management device to implement the restoration procedure in the network. The fault management device is operable to correlate the fault with the at least one network resource using a configuration map of the network to determine where the fault has occurred in the path.

Further features of the invention are as claimed in the dependent claims.

According to a third aspect of the invention there is provided a computer program product operable to perform the method according to the first aspect of the invention.

According to a fourth aspect of the invention there is provided a communications network operable to perform the method according to the first aspect of the invention, or including a network manager apparatus according to the second aspect of the invention.

BRIEF DESCRIPTION OF THE DRAWINGS

Features of the invention will be apparent from the following description of preferred embodiments shown by way of example only with reference to the accompanying drawings, in which.

DETAILED DESCRIPTION

Figure 1:
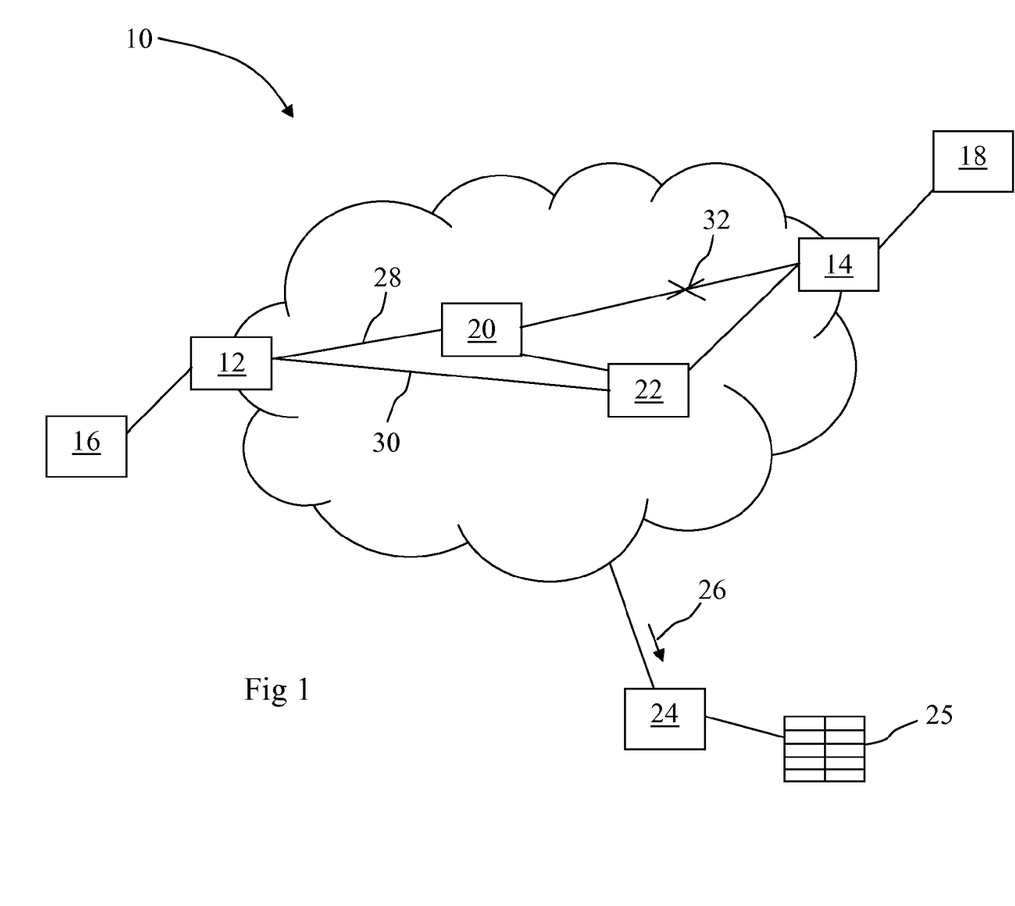
FIG. 1 shows a diagram of a communications network to describe embodiments of the invention.

FIG. 1 shows a diagram of a communications network used as a reference network to describe embodiments of the invention, generally designated 10. In FIG. 1 the communications network 10 has two provider edge nodes 12, 14. The provider edge node 12 is in communication with a customer node 16. The provider edge node 14 is in communication with a customer node 18. The network 10 also has a worker node 20 and a protection node 22. The worker node 20 and the protection node 22 are each in communication with the two provider edge devices 12, 14. The worker node 20 and the protection node 22 are also in communication with one another.

The network 10 is controlled by a management plane apparatus 24, which is a server or node such as a network manager apparatus, having network control software, and which is programmed to operate to perform the functions according to the embodiment described below. The management plane apparatus 24 has a global view of the network and is operable to determine a configuration map 25 for the network 10 which may be a database or a table listing the nodes 12, 14, 16, 18, 20, 22 of the network 10 and connections between them. The configuration map 25 shows the topology of the network 10 in terms of links between nodes 12, 14, 16, 18, 20, 22 and paths within those links. The management plane apparatus 24 may be under the control of a network operator or other third party.

The nodes 12, 14, 16, 18, 20, 22, 24 may alternatively be known as Network Elements (NEs). The network 10 is a general Optical Transport Network (OTN) which may comprise different types of networks such as a core Dense Wavelength Division Multiplexing (DWDM) network and a Synchronous Digital Hierarchy (SDH) networks. The network 10 may be, for example, a Carrier Ethernet network operating via Multi Protocol Label Switching (MPLS). Such MPLS may include Transport Multi Protocol Label Switching (T-MPLS) or Multi Protocol Label Switching Transport Profile (MPLS-TP). It will be appreciated that such a network is a Connection Oriented Packet Switched (CO-PS) network.

For the customer node 16 to communicate with the customer node 18, a worker path 28 must be determined through the network 10. The worker path 28 is shown to include provider node 12, the worker node 20, and the provider node 14. In the network 10 a connection between nodes, such as between nodes 16 and 18, is defined by a connection identifier in data packets to be transmitted from one node to the other. Also shown is a protection path 30 between the provider edge nodes 12 and 14. The protection path 30 connects the provider edge device 12 to the protection node 22, and the protection node 22 to the provider edge device 14. The protection path 30 is used when a failure or fault 32 occurs in the worker path 28. It will be appreciated that the paths between each provider edge device 12, 14 and either the worker node 20 or the protection node 22 may cross many additional network devices such as nodes of the network, which have been omitted for the purposes of clarity.

In this specification the words failure or fault are used, which could be a complete failure or a partial failure such as a degradation of a link or a node. Such a failure may be a failure of a link or a path or an item of network equipment such as a node. The management plane apparatus 24 is operable to receive an alarm signal or indication 26 relating to the failure 32 in the network 10. The alarm indication 26 may be a Loss of Signal (LOS) or Loss of Connection (LOC) alarm according to known arrangements. It will be appreciated that for the network 10 operating MPLS the paths 28, 30 are Label Switched Paths (LSPs).

Figure 2:
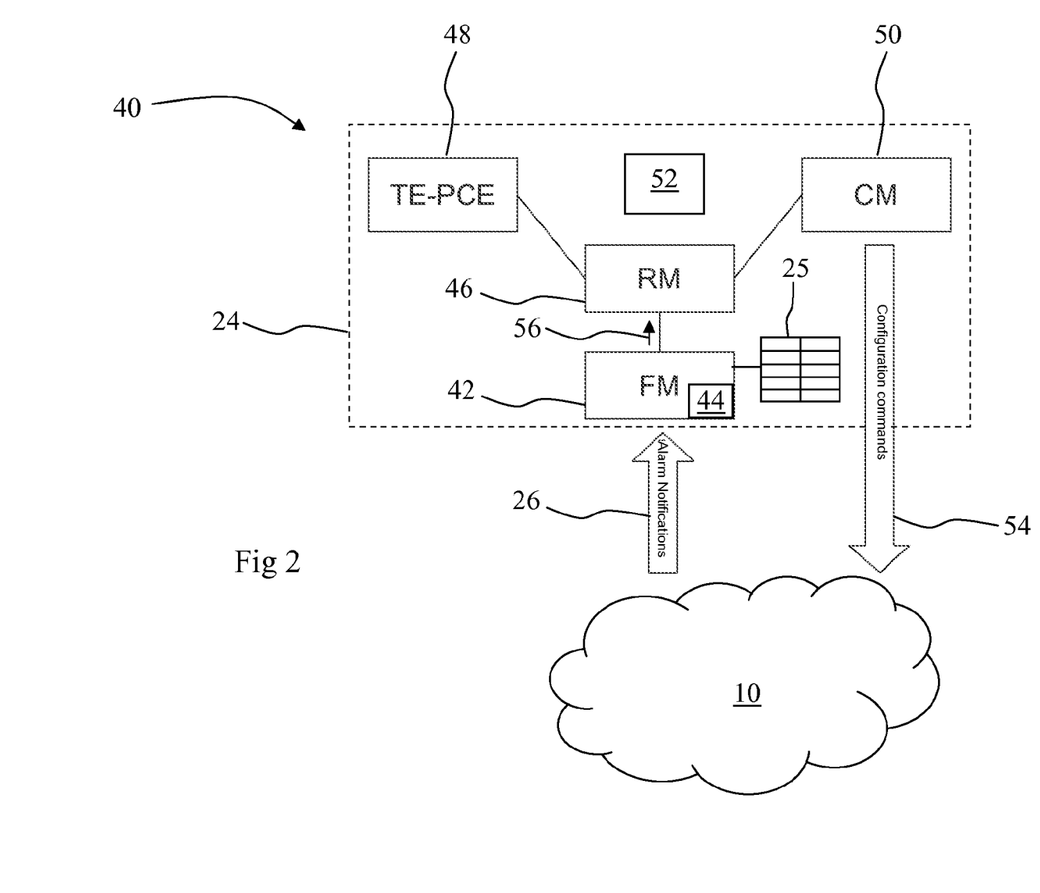
FIG. 2 shows a diagram of modules for a management plane apparatus shown in FIG. 1 according to an embodiment of the invention.

FIG. 2 shows a diagram of modules for the management plane apparatus 24 shown in FIG. 1 according to an embodiment of the invention, generally designated 40. In FIG. 2 like features to the arrangements of FIG. 1 are shown with like reference numerals. In FIG. 2 the modules 40 include a Fault Management (FM) device 42 having a filter device 44, a Restoration Management (RM) device 46, a Traffic Engineering Path Computation Engine (TE-PCE) 48, a Configuration Management (CM) device 50, and a memory device 52. The modules 40 may be alternatively termed a management plane of the network 10. It will be appreciated that such a management plane 40 operates to carry and/or implement the operations, administration, maintenance and configuration traffic required for network management. The Traffic Engineering Path Computation Engine (TE-PCE) 48 may be alternatively termed a path computation device.

The Fault Management device 42 is in communication with the network 10 and is operable to receive at least one alarm indication 26 relating to the failure 32. In practice there may be many alarm indications 26 relating to the same failure 32, for example up to ten or more alarm indications 26 from adjacent nodes 14, 20 relating to failed connections with adjacent nodes and/or failed links and/or paths. The filter device 44 is operable to process the alarm indications 26 to isolate the failure 32. The Fault Management device 42 is operable to determine where the failure 32 has occurred by correlating the failure 32 with the network resources by looking at the configuration map 25 of the network. The Fault Management device 42 then generates a network level alarm 56 within the management plane apparatus 24. The Restoration Management device 46 is in communication with the Fault Management device 42 and receives the network level alarm 56. In response to the network level alarm 56 the Restoration Management device 46 initiates a restoration procedure for the affected path 28 if required. The path computation device 48 is in communication with the restoration management device 46 and calculates the protection path 30 if it is required by the restoration management device 46. Such calculation is performed by the path computation device 48 which performs automatic routing computation based on optimised path cost and routing constraints. This may require a bandwidth allocation activity to assign the required level of bandwidth to the protection path 30 to provide sufficient protection for the failed path. Such a bandwidth allocation activity may be performed by the path computation device 48, and is required for a CO-PS network because the bandwidth for a path is not predetermined as per the prior art arrangements such as SDH.

The Configuration Management device 50 is responsible for implementing the configuration commands 54 as requested by the restoration management device 46. The configuration commands 54 may operate to add a new protection path that did not previously exist, or to switch traffic to a protection path 30 that did previously exist. The configuration commands 54 may further operate to designate the protection path 30 as the new worker path, and/or to switch the roles of the protection path 30 with the worker path 28, and/or to remove a failed path which may be the worker path 28 or the protection path 30. The Configuration Management device 50 is capable of configuring the nodes 12, 14, 16, 18, 20, 22 and other resources in the network 10 to set up these protection schemes. The configuration commands 54 may include Traffic Engineering (TE) commands including parameters which specify routing constraints such as the assignment of administration colours to links, or the use of Shared Risk Groups (SRGs), or other metrics used for network configuration. In this regard it will be appreciated that the Restoration Management device 46 also operates to coordinate commands between the path computation device 48 and the Configuration Management device 50 to provide the management plane restoration having the functionality described herein.

The memory device 52 of the management plane apparatus 24 is used to store a configuration of the network 10 prior to any configuration commands 54 being implemented. This configuration relates to the map of the network 10 with the failure 32. This is a useful feature so that the network 10 can be changed back to a previous configuration if required once the failure 32 has been attended to.

It will be appreciated that whereas the modules 40 are shown to be located in the management plane apparatus 24, one or more of the modules 40 may be located away from the management plane apparatus 24 such as in another node of the network. In this embodiment the management plane apparatus 24 would be a distributed apparatus. In another embodiment the modules 40 are implemented in software that may reside in the management plane apparatus 24 or in one or more nodes located away from the management plane apparatus 24 such as another node of the network.

Figure 3:
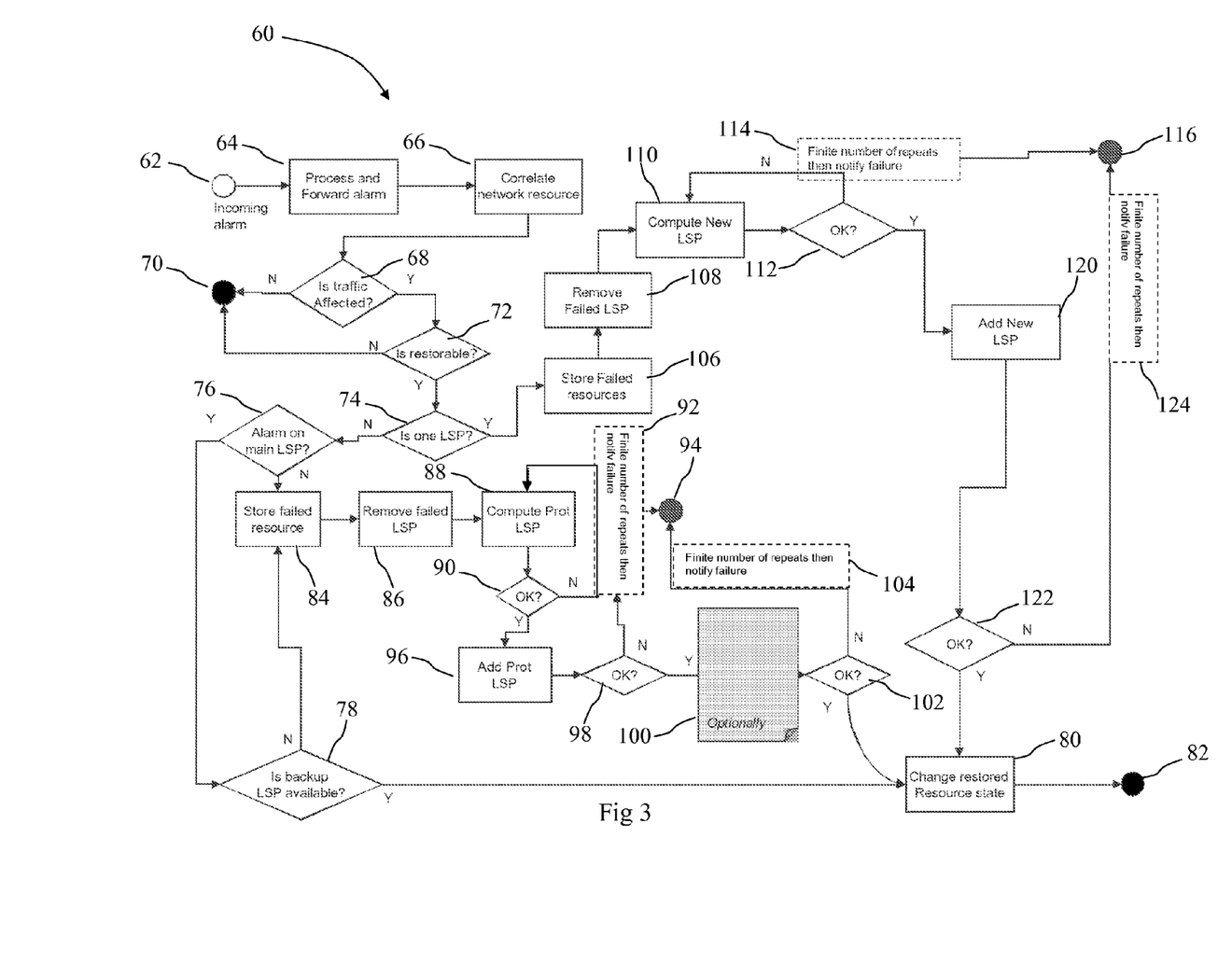
FIG. 3 shows a flow diagram illustrating a method according to an embodiment of the invention.

FIG. 3 shows a flow diagram illustrating a method according to an embodiment of the invention, generally designated 60. The method 60 is performed by the modules 40 of the management plane apparatus 24 shown in FIG. 2, and relates to a method of protecting communications traffic in the communications network 10 using the management plane 40. In FIG. 3 the method includes detecting the fault 32, also known as a failure, in the path 28 of the network as shown at 62, the path 28 comprising at least one network resource such as the nodes 12, 14, 16, 18, 20. Detecting the failure 32 is achieved by receiving at least one incoming alarm indication 26 and processing the received alarm indications 26 to isolate the failure as shown at 64. In reality there may be many alarm indications 26 such as ten or more alarm indications 26 from adjacent nodes 14, 20 relating to failed connections with adjacent nodes and/or failed links. The method then determines where the failure 32 has occurred in the path 28 using the management plane 40 to correlate the failure 32 with the at least one network resource using the configuration map 25 of the network 10, as shown at 66. The management plane 40 has ready access to the configuration map 25, and determines where the failure 32 has occurred by comparing the alarm indications 26 with the configuration map 25. Once the failure 32 has been isolated the method then continues to forward a network level alarm 56.

The method then determines whether the traffic is affected by the failure 32, as shown at 68. If the traffic is not affected the method ends, as shown at 70. If the traffic is affected the method continues by determining if the failure 32 is restorable, as shown at 72. If the failure is not restorable the method ends, as shown at 70. If the failure 32 is restorable the method then determines if it relates to only one path, such as one LSP, as shown at 74.

If the failure 32 does not relate to only one path, for example it relates to at least two paths, the method continues to determine if the alarm indication 26 relates to the worker path 28, which may be the main LSP, as shown at step 76. If the alarm indication 26 does relate to the worker path 28 the method continues to determine whether the protection path 30 is available, which may be a backup LSP, as shown at 78. If the protection path 30 is available the method continues to change the restored resource state as shown at 80 which updates the management plane 40 to indicate that the traffic is restored and that the management plane restoration procedure has been successful. The method then ends as shown at 82.

At step 78, if the protection path 30 is not available the method continues to store the configuration of the network containing the failure 32 in the memory device 52, as shown at 84. In this scenario the failure 32 may relate to a multiple failure such as a failure of the worker path 28 and the protection path 30. At step 76, if the alarm indication 26 does not relate to the worker path 28, the method continues to store the configuration of the network containing the failure 32 in the memory device 52, as shown at 84. Such storing of a network configuration as shown at 84 is a useful feature because it permits the network to be returned to a previous configuration at a later date once the failure 32 has been attended to. At step 76, if the alarm indication 26 does not relate to the worker path 28, it is an indication that the failure 32 relates to the protection path 30.

After step 84 the method then continues to remove the failed path, as shown at 86, which may be the worker path 28 or the protection path 30. Removal of the path may be achieved by deleting the configuration details for the path from the configuration map 25. The method then continues to determine the new protection path, which may be a protection LSP, as shown at 88. Determination of the new protection path is performed by the path computation device 48 which may include allocating a bandwidth requirement to the new protection path to provide sufficient capacity to handle the traffic that was previously carried by the failed path. The method then checks if the determination of the new protection path was successful as shown at 90. If the determination of the new protection path was not successful the method continues to repeat the determination of the new path for a finite number of times, as shown at 92. The finite number of times may be, for example, ten or more times. Such repeating of the determination of the new path is a useful feature because there may be many legitimate reasons why the path may not be confirmed as being successfully determined on the first occasion. When the determination has been repeated for a finite number of times, for example ten times, and does not result in determination of the new protection path the method is ended as shown at 94. The failure of the method 60 to provide a protection scheme is then reported to the management plane 40. If the determination of the new protection path was successful the method continues to add the new protection path to the configuration map 25, as shown at 96, which may include cross connecting with associated nodes.

The method then checks if the new protection path has been successfully added to the configuration map 25, as shown at 98. If the new protection path was not successfully added the method repeats the adding of the new protection path for a finite number of times, as shown at 92. The finite number of times may be, for example, ten or more times. Such repeating of the adding of the new path is a useful feature because there may be many legitimate reasons why the path may not be confirmed as being successfully determined on the first occasion. When the repetition has not resulted in adding of the new protection path the method is ended as shown at 94. The failure of the method 60 to provide a protection scheme is then reported to the management plane 40. If the addition of the new protection path was successful the method optionally continues to switch to the new protection path permanently in a non-revertive manner, as shown at 100. The method then continues to perform one final check to make sure that the new protection path is functioning correctly, as shown at 102. If the new protection path is not functioning correctly the method continues to 104 where the method repeats the step 100 and the step 102 for a finite number of times. The finite number of times may be, for example, ten or more times. When the repetition of steps 100 and 102 has not resulted in a successful restoration scheme the method is ended as shown at 94. The failure of the method 60 to provide a protection scheme is then reported to the management plane 40. If the repetition of steps 100 and 102 was successful the method continues to change the restored resource state, as shown at 80, which updates the management plane 40 to indicate that the traffic is restored and that the management plane restoration procedure has been successful. The method then ends as shown at 82.

After step 74, if the method determines that the failure 32 relates to only one path the method continues to store the configuration of the network containing the failure 32 in the memory device 52, as shown at 106. In this scenario the failure 32 relates to a single failure such as a failure of the worker path 28 where there is no protection path 30. After step 106 the method then continues to remove the failed path, as shown at 108, which may be the worker path 28. Removal of the path may be achieved by deleting the configuration details for the path from the configuration map 25. The method then continues to determine the new protection path, which may be a protection LSP, as shown at 110. Determination of the new protection path is performed by the path computation device 48 which may include allocating a bandwidth requirement to the new protection path to provide sufficient capacity to handle the traffic that was previously carried by the failed path. The method then checks if the determination of the new protection path was successful as shown at 112. If the determination of the new protection path was not successful the method continues to repeat the determination of the new path for a finite number of times, as shown at 114. The finite number of times may be, for example, ten or more times. Such repeating of the determination of the new path is a useful feature because there may be many legitimate reasons why the path may not be confirmed as being successfully determined on the first occasion. When the determination has been repeated for a finite number of times, for example ten times, and does not result in determination of the new protection path the method is ended as shown at 116. The failure of the method 60 to provide a protection scheme is then reported to the management plane 40. If the determination of the new protection path was successful the method continues to add the new protection path to the configuration map 25, as shown at 120, which may include cross connecting with associated nodes.

The method then checks if the new protection path has been successfully added to the configuration map 25, as shown at 122. If the new protection path was not successfully added the method repeats the adding of the new protection path for a finite number of times, as shown at 124. The finite number of times may be, for example, ten or more times. Such repeating of the adding of the new path is a useful feature because there may be many legitimate reasons why the path may not be confirmed as being successfully determined on the first occasion. When the repetition has not resulted in adding of the new protection path the method is ended as shown at 116. The failure of the method 60 to provide a protection scheme is then reported to the management plane 40. If the check at step 122 was successful the method continues to change the restored resource state, as shown at 80, which updates the management plane 40 to indicate that the traffic is restored and that the management plane restoration procedure has been successful. The method then ends as shown at 82.

The above description of the method 60 shows that the protection scheme can be applied to both protected and unprotected paths, which may be MPLS paths. The embodiments described are applicable for 1+1 and 1:1 protection, or unprotected paths.

The protection path used as per the method 60 may be applied in a Revertive or Non-Revertive manner as per the following description using configuration commands 54.

After step 74, where it is determined that there is no protection path, the method 60 eventually proceeds to step 110 where a protection path is determined "On The Fly" (OTF). For Revertive OTF restoration the management plane 40 calculates and sets up the protection path 30 and it switches the traffic onto it leaving the failed worker path 28 untouched. Once the failure 32 on the worker path 28 has been cleared the management plane 40 switches the traffic back to the worker path 28 and removes the protection path 30 previously calculated to restore the traffic. In the case of Non-Revertive OTF restoration the management plane 40 calculates and sets up the protection path 30 and it switches the traffic onto it. The management plane 40 then swaps the roles of the worker path 28 and the protection path 30 so that the protection 30 becomes a new worker path. The worker path 28 is then removed by the management plane 40. In this scenario, once the failure 32 on the former worker path 28 has cleared, no action is taken by the management plane 40 so that the traffic remains on the new worker path 30.

After step 74, where it is determined that the protection path 30 does exist, the method 60 eventually proceeds to step 84 where it is determined that the protection path 30 has failed resulting in a loss of resilience of the network. In this scenario a new protection path is calculated and established by the management plane 40. The former protection path 30 is then removed by the management plane 40. After step 74, where it is determined that the failure 32 is on the worker path 28 and the protection path 30 is unavailable due to a multiple fault, a new protection path will be calculated and established by the management plane 40 to restore the traffic. The former protection path 30 will then be removed by the management plane 40.

The advantages of certain embodiments of the invention described above relate to an improved utilisation of resources which may lead to an improved bandwidth usage for the network 10. This is because certain embodiments use an approach whereby the new path is determined or used only after it is known that the old path has failed. This may also lead to a reduced operational expenditure for the network 10 due to simplified operational management of the network. In certain embodiments the protection path 30 is not calculated prior to the failure 32 occurring which means that protection path resources are shared between different worker paths at different times. The improved utilisation of network resources may also lead to a reduced capital expenditure for the network. Furthermore, the improved way of protecting communications traffic may lead to a reduction in the network down time.

The method 60 implements an automated restoration scheme for determining fault conditions that reduces the need for manual intervention. Such manual intervention, as per the prior art, is generally more error-prone than an automated process for restoration. Overall the embodiments of the invention may help to reduce or minimise down-time for network services. Implementing this approach using the management plane permits the network 10 to be optimised for restoration more easily than implementing restoration using the control plan as per the prior art. This is because problems due to incompatibility of protocols are less likely than restoration schemes operated by the control plane.

Figure 4:
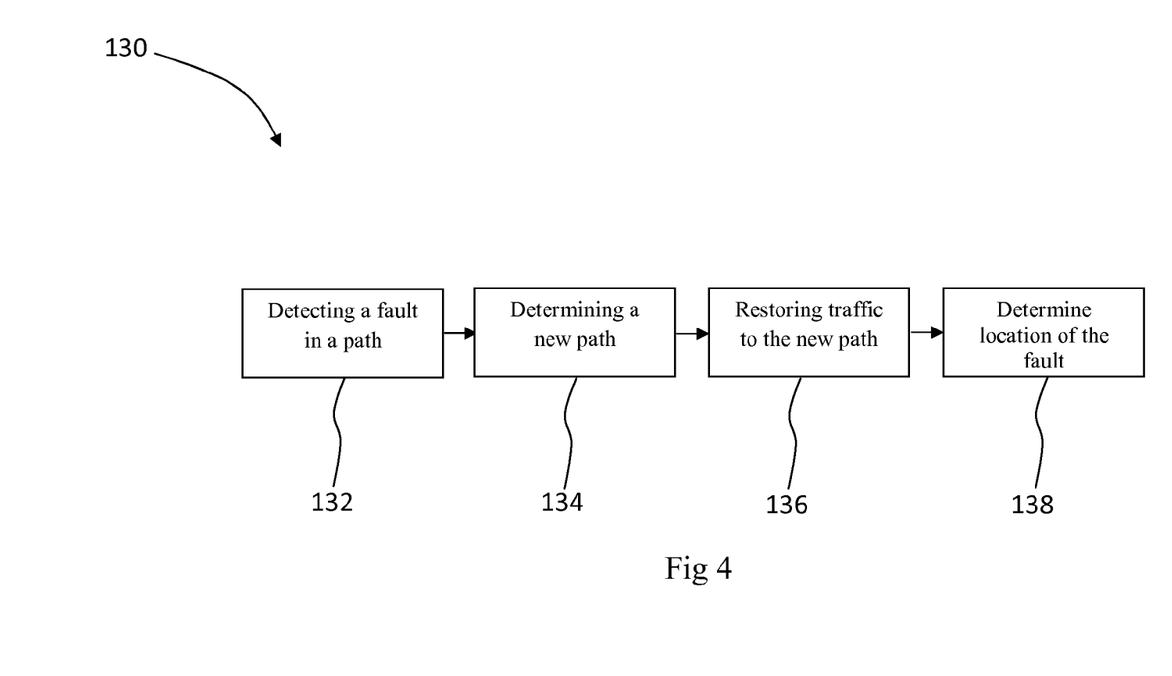
FIG. 4 shows a flow diagram illustrating a method according to an embodiment of the invention.

FIG. 4 shows a flow diagram illustrating a method according to an embodiment of the invention, generally designated 130. The method 130 is performed by the modules 40 of the management plane apparatus 24 shown in FIG. 2, and relates to a method of protecting communications traffic in the communications network 10 using the management plane 40. In FIG. 4 the method includes detecting the fault 32 in the path 28 of the network, as shown at 132. The path 28 comprises at least one network resource. The method includes determining a new path 30 for the traffic, as shown at 134. The method includes restoring the traffic to the new path 30, as shown at 136. The method includes determining the location of the fault 32 in the path 28 using the management plane 40 to correlate the fault with the at least one network resource using a configuration map 25 of the network 10.

Whereas simple examples of implementing the method 60 have been described herein with reference to FIGS. 1-4, it will be understood that a real life network would be much more complex. Accordingly, using the method 60, 130 the time and effort to implement restoration schemes in such a real life network would be even further reduced. Using the method 60, 130 the network operator is provided with a much more efficient tool for handling failures in the network 10 when compared to the prior art. The embodiments of the invention described herein may also be able to provide an improved operation and maintenance for the network 10 if it is changed, for example, due to an upgrade of an item of network equipment. The method 60, 130 may further be thought of as a way to discover changes and automatically plan failure routes as required.

The embodiments described above show how restoration can be achieved in the Management Plane in the network 10 which may use T-MPLS or MPLS-TP. This is achieved using a combination of fault management and configuration management functionalities as per the arrangements of the modules 40 of FIG. 2 and the method 60, 130 of FIGS. 3 and 4. It will be appreciated that the embodiments described herein provide an automated dynamic protection scheme via the management plane.

The invention claimed is:

1. A method of protecting communications traffic in a connection oriented packet switched communications network using a management plane, the method including:
    detecting a fault in a path of the network, the path comprising at least one network resource;
    determining where the fault has occurred in the path using the management plane to correlate the fault with the at least one network resource using a configuration map of the network, wherein the at least one network resource is one of nodes of the connection oriented packet switched communications network;
    removing the path containing the fault upon determining that the fault affects only a predetermined protection path;
    determining a new path for the communications traffic upon determining both that the communication traffic is affected by the fault and the communication traffic is restorable; and
    restoring the communications traffic to the new path.

2. The method according to claim 1, further including detecting the fault using at least one alarm signal, and processing the at least one alarm signal to provide a network level alarm.

3. The method according to claim 1, further including using the predetermined protection path as the new path.

4. The method according to claim 1, further including determining the new path using a path computation device of the management plane.

5. The method according to claim 4, further including determining the new path after the fault has occurred.

6. The method according to claim 1, further including storing a configuration of the network prior to removing the path containing the fault.

7. The method according to claim 1, further including using the management plane to determine if the path having the fault has an associated path using the configuration map.

8. A management plane apparatus for protecting communications traffic in a connection oriented packet switched communications network, comprising:
    a fault management device to receive at least one alarm indication relating to a fault in a path of the network, the path comprises at least one network resource;
    a restoration management device to initiate a restoration procedure in response to the at least one alarm indication relating to the fault in the path of the network to restore the communications traffic to a new path, wherein the restoration procedure includes removing the path containing the fault upon determining that the fault affects only a predetermined protection path, determining both that the communications traffic is affected by the fault and the communications traffic is restorable prior to restoring the communications traffic to the new path; and
    a configuration management device to implement the restoration procedure in the network;
    wherein the fault management device is operable to correlate the fault with the at least one network resource using a configuration map of the network to determine where the fault has occurred in the path, and wherein the at least one network resource is one of nodes of the connection oriented packet switched communications network.

9. The apparatus according to claim 8, wherein the fault management device includes a filter device to process the at least one indication to provide a network level alarm.

10. The apparatus according to claim 8, wherein the configuration management device is operable to implement the restoration procedure with the new path which comprises the predetermined protection path.

11. The apparatus according to claim 8, further including a path computation device to determine the new path, wherein the configuration management device is operable to implement the restoration procedure to restore the traffic with the new path.

12. The apparatus according to claim 11, wherein the path computation device is operable to determine the new path following receipt of the at least one indication.

13. The apparatus according to claim 8, further including a memory device to store a configuration of the network prior to implement the restoration procedure.

14. The apparatus according to claim 8, wherein the fault management device is operable to determine if the path having the failure has an associated path using the configuration map.

* * * * *